(12) United States Patent
Noordover et al.

(10) Patent No.: US 12,281,197 B2
(45) Date of Patent: Apr. 22, 2025

(54) RMA CROSSLINKABLE POLYMER

(71) Applicant: ALLNEX NETHERLANDS B.V., Bergen Op Zoom (NL)

(72) Inventors: Bart Adrianus Johannes Noordover, Bergen Op Zoom (NL); Natasja Looij, Bergen Op Zoom (NL); Brenda Pijper, Bergen Op Zoom (NL); Jurgen Kalis, Bergen Op Zoom (NL); Ronald Koeken, Bergen Op Zoom (NL)

(73) Assignee: ALLNEX NETHERLANDS B.V.

( * ) Notice: Subject to any disclaimer, the term of this patent is extended or adjusted under 35 U.S.C. 154(b) by 719 days.

(21) Appl. No.: 17/297,468

(22) PCT Filed: Dec. 4, 2019

(86) PCT No.: PCT/EP2019/083708
§ 371 (c)(1),
(2) Date: May 27, 2021

(87) PCT Pub. No.: WO2020/115153
PCT Pub. Date: Jun. 11, 2020

(65) Prior Publication Data
US 2022/0041802 A1   Feb. 10, 2022

(30) Foreign Application Priority Data

Dec. 4, 2018 (EP) .................................. 18210172

(51) Int. Cl.
| | | |
|---|---|---|
| *C08G 63/42* | (2006.01) | |
| *C08G 63/137* | (2006.01) | |
| *C08G 63/85* | (2006.01) | |
| *C09D 167/02* | (2006.01) | |

(52) U.S. Cl.
CPC ........... *C08G 63/42* (2013.01); *C08G 63/137* (2013.01); *C08G 63/85* (2013.01); *C09D 167/02* (2013.01)

(58) Field of Classification Search
CPC ...... C08G 63/42; C08G 63/137; C08G 63/85; C09D 167/02
See application file for complete search history.

(56) References Cited

U.S. PATENT DOCUMENTS

| | | |
|---|---|---|
| 2,635,100 A | 4/1953 | Werntz |
| 4,102,863 A | 7/1978 | Buchwalter et al. |
| 4,197,230 A | 4/1980 | Baney et al. |
| 4,217,396 A | 8/1980 | Heckles |
| 4,268,610 A | 5/1981 | Roos |
| 4,348,431 A | 9/1982 | William |
| 4,408,018 A | 10/1983 | Bartman et al. |
| 4,529,487 A | 7/1985 | Hsu et al. |
| 4,602,061 A | 7/1986 | Akkerman |
| 4,677,028 A | 6/1987 | Heeringa et al. |
| 4,742,096 A | 5/1988 | Craun |
| 4,804,715 A | 2/1989 | Leonard et al. |
| 4,859,473 A | 8/1989 | Arciszewski et al. |
| 4,871,822 A | 10/1989 | Brindopke et al. |
| 5,017,649 A | 5/1991 | Clemens |
| 5,137,966 A | 8/1992 | Nodelman |
| 5,169,979 A | 12/1992 | Kubillus et al. |
| 5,219,958 A | 6/1993 | Noomen et al. |
| 5,288,802 A | 2/1994 | Walters et al. |
| 5,565,525 A | 10/1996 | Morimoto et al. |
| 5,665,814 A | 9/1997 | Lewis et al. |
| 5,959,028 A | 9/1999 | Irie et al. |
| 5,973,049 A | 10/1999 | Bieser et al. |
| 5,973,082 A | 10/1999 | Elmore |
| 5,990,224 A | 11/1999 | Raynolds et al. |
| 6,005,035 A | 12/1999 | Raynolds et al. |
| 6,201,048 B1 | 3/2001 | Raynolds et al. |
| 6,204,343 B1 | 3/2001 | Barucha et al. |
| 6,262,169 B1 | 7/2001 | Helmer et al. |
| 6,608,225 B1 | 8/2003 | Larson et al. |
| 6,706,414 B1 | 3/2004 | Dammann et al. |
| 2003/0023108 A1 | 1/2003 | E. Walker |
| 2006/0287408 A1 | 12/2006 | Baikerikar et al. |
| 2007/0066768 A1 | 3/2007 | Gauthier et al. |
| 2007/0173602 A1* | 7/2007 | Brinkman .............. C09J 133/14 524/592 |
| 2008/0139755 A1 | 6/2008 | Brinkhuis |
| 2011/0028636 A1 | 2/2011 | Hobisch et al. |
| 2012/0095146 A1 | 4/2012 | Schoenleitner et al. |
| 2013/0041091 A1 | 2/2013 | Brinkhuis et al. |
| 2013/0317156 A1 | 11/2013 | Yu |
| 2014/0051787 A1 | 2/2014 | Kann et al. |
| 2014/0179829 A1 | 6/2014 | Burckhardt et al. |
| 2014/0220252 A1 | 8/2014 | Brinkhuis et al. |

(Continued)

FOREIGN PATENT DOCUMENTS

| | | |
|---|---|---|
| CN | 1609058 A | 4/2005 |
| CN | 101869844 A | 10/2010 |

(Continued)

*Primary Examiner* — Doris L Lee

(74) *Attorney, Agent, or Firm* — David P. Owen; Hoyng Rokh Monegier B.V.

(57) ABSTRACT

The invention relates to an RMA crosslinkable polymer comprising: a) at least one RMA Donor moiety X comprising a C—H acidic proton in activated methylene or methine groups, b) at least one moiety Y comprising one or more 5- or 6-membered heterocycles containing an ether-, acetal- or ketal group which in case of two or more of such heterocycles can be fused or linked, wherein the polymer has a weight-average molecular weight Mw of at least 400 g/mol and a C—H equivalent molecular weight CH EQW of at least 80 g/mol. The invention also relates to a process for the preparation of the RMA crosslinkable polymer, to an RMA crosslinkable composition comprising the RMA crosslinkable polymer and coated substrates.

24 Claims, No Drawings

(56) References Cited

U.S. PATENT DOCUMENTS

| | | | |
|---|---|---|---|
| 2014/0221542 A1* | 8/2014 | Brinkhuis | B01J 31/0205 528/308 |
| 2014/0235785 A1 | 8/2014 | Brinkhuis et al. | |
| 2016/0060389 A1 | 3/2016 | Brinkhuis et al. | |
| 2018/0127615 A1 | 5/2018 | De Wolf et al. | |
| 2018/0134913 A1 | 5/2018 | De Wolf et al. | |
| 2018/0163081 A1 | 6/2018 | Goedegebuure et al. | |
| 2018/0163083 A1 | 6/2018 | Brinkhuis et al. | |
| 2021/0062009 A1 | 3/2021 | Brinkhuis et al. | |

FOREIGN PATENT DOCUMENTS

| | | | |
|---|---|---|---|
| CN | 101879457 A | 11/2010 | |
| DE | 835809 C | 4/1952 | |
| EP | 0326723 A1 | 8/1989 | |
| EP | 1593727 A1 | 11/2005 | |
| EP | 2072520 A1 | 6/2009 | |
| EP | 3085748 A1 | 10/2016 | |
| GB | 729527 A | 5/1955 | |
| GB | 2405149 A | 2/2005 | |
| JP | 853141369 A | 12/1978 | |
| JP | H08319437 A | 12/1996 | |
| JP | H10330690 A | 12/1998 | |
| JP | 2000119353 A | 4/2000 | |
| JP | 2001207631 A | 8/2001 | |
| JP | 2005034687 A | 2/2005 | |
| JP | 2011099744 A | 5/2011 | |
| JP | 2011208371 A | 10/2011 | |
| JP | 2013091982 A | 5/2013 | |
| JP | 2013108339 A | 6/2013 | |
| JP | 2015120769 A | 7/2015 | |
| NL | 8203502 A | 4/1984 | |
| WO | 1996041833 A1 | 12/1996 | |
| WO | 2000004106 A1 | 1/2000 | |
| WO | 2005021672 A1 | 3/2005 | |
| WO | 2012002095 A1 | 1/2012 | |
| WO | 2014125589 A1 | 8/2014 | |
| WO | 2016054367 A1 | 4/2016 | |
| WO | WO-2016166381 A1 * | 10/2016 | B05D 3/067 |
| WO | 2019 145472 A1 | 8/2019 | |

* cited by examiner

RMA CROSSLINKABLE POLYMER

The invention relates to an RMA crosslinkable polymer having improved adhesion to substrates, to the use thereof in RMA crosslinkable compositions, in particular coating compositions, to RMA crosslinkable compositions and coating composition comprising the RMA crosslinkable polymer, to methods for applying a coating on a substrate and coated substrates prepared with that method.

RMA crosslinkable compositions are compositions comprising reactive components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C═C) (RMA acceptor group). These reactive groups react to give crosslinking by Real Michael Addition (RMA) reaction in the presence of a base catalyst (C). RMA means Real Michael addition, wherein Real implies that a strong carbon-carbon bond is formed.

Such RMA crosslinkable compositions are described in EP2556108. Herein a catalyst C is described which is a substituted carbonate catalyst which decomposes in a coating layer to generate carbon dioxide which evaporates from the applied curing coating layer and a strong base which starts the RMA crosslinking reaction. The catalyst provides long pot-life and at the same time a high reactivity when applied as a coating layer where $CO_2$ can escape.

The general problem underlying the invention is to improve the adhesion of RMA crosslinkable compositions to a substrate. It is common in the art to improve adhesion by pretreating the substrate surface with a primer layer. In the General Industrial, Marine, Protective, and ACE markets, topcoats are usually applied over an epoxy-amine primer layer, for example the commercially available system Intercure 200HS from AkzoNobel.

Adhesion studies of coatings based on RMA crosslinkable compositions were carried out over many different types of commercially available epoxy primers used in a wide field of end use applications including general industry, ACE and protective coatings. However, known epoxy primers do not always give good adhesions results for coatings based on RMA crosslinkable compositions.

In WO 2016/166365 the adhesion problem of RMA crosslinkable compositions has been addressed by adding to an RMA crosslinkable composition an adhesion promotor comprising a moiety reactive with donor component A or acceptor component B of the RMA crosslinkable composition and a moiety comprising heterocyclic nitrogen containing heterocyclic group or a polar functional group.

In WO 2016/166369 the adhesion problem of RMA crosslinkable compositions has been addressed by addition of a functional alkoxy-silane comprising one or more alkoxy-silane groups connected to a functional moiety comprising a functional group (or precursor thereof) reactive with component A or component B.

In WO 2016/166371 the adhesion problem of RMA crosslinkable compositions has been addressed by applying on the substrate surface a layer of an epoxy primer which after curing comprises functional groups X reactive with crosslinkable component A or B of the RMA crosslinkable composition.

Good adhesion is important in various uses of the RMA crosslinkable composition like in a coating, sealant, adhesive, elastomer, ink or foam, but is particularly important in coating compositions, comprising the RMA crosslinkable composition as the binder system. It is a problem to provide an RMA crosslinkable system that has a good adhesion and wherein the adhesion is not so much influenced by the choice of the primer system and curing conditions thereof. In practice, sometimes high temperature baked epoxy primers are used and sometimes room temperature (RT) cured epoxy primers are used and it is desirable that the adhesion is good on both types of primer. However, it was found that the adhesion of RMA crosslinkable coating compositions on RT cured primer and on baked primer may differ significantly. Also, the adhesion must be good irrespective of whether the coated substrate is used in dry or in wet conditions. In particular QCT resistance (i.e. wet adhesion) is quite specific and hard to achieve in coatings. On the other hand, the polymer for it to be useful as a coating polymer must combine adhesion with hardness, good appearance and, once cured, excellent chemical and weathering resistance.

Therefore, there remains a desire to improve the adhesion of RMA crosslinked compositions and provide RMA crosslinkable polymers and/or RMA crosslinkable compositions that show improved adhesion, preferably without a need for addition of separate adhesion promotion compounds, and preferably also in varying and demanding conditions as described above, whilst maintaining on the other hand acceptable curing speed and mechanical-, chemical- and appearance properties of the cured composition.

According to the invention one or more of the above-mentioned problems have been solved by providing an RMA crosslinkable polymer comprising:
  a. at least one RMA Donor moiety X comprising a C—H acidic proton in activated methylene or methine groups,
  b. at least one moiety Y comprising one or more 5- or 6-membered heterocycles containing an ether-, acetal- or ketal group which in case of two or more of such heterocycles can be fused or linked
    wherein the polymer has a weight-average molecular weight Mw of at least 400, preferably at least 450, more preferably at least 500 g/mol and a C—H equivalent weight CH EQW of at least 80, preferably at least 100 g/mol.

As illustrated by the examples, the polymer according to the invention has significantly improved adhesion whilst maintaining good other properties in coating applications.

Herein the term polymer implies a reaction product of monomer units having a molecular weight distribution and weight-average molecular weight Mw of at least 400 g/mol. Thus, the term polymer includes not only high molecular weight product but also what is often referred to as oligomeric low molecular weight polymer product.

The C—H equivalent weight CH EQW means the equivalent weight of the polymer per Michael-active proton C—H provided by moiety X. If different types of moieties X are present, then the total CH EQW implies the EQW per C—H irrespective of the type of moiety X. In case of two different moieties X referred to as X1 and X2, for example from malonate and from acetoacetate, CH EQW X1 is the EQW per C—H in moiety X1 and CH EQW X2 is the EQW per C—H in moiety X2. It is noted that activated methylene has 2 RMA active C—H and activated methine has 1 RMA active C—H.

US 2007/0173602 describes RMA crosslinkable adhesive compositions wherein a strong base catalyst is encapsulated. The crosslinking reaction starts by disrupting the encapsulation. The crosslinkable components in the composition may comprise bio-based monomers and have low molecular weight and low C—H equivalent weight.

WO 2016/054367 describes a method of making a hollow fiber membrane module by potting the end portion of the plurality of hollow fiber membranes with a curable composition comprising a multi-functional Michael donor, a multi-functional Michael acceptor and a Michael reaction catalyst. The crosslinkable components in the composition may comprise bio-based monomers and have low molecular weight and C—H equivalent weight or do not comprise moiety Y.

Here and hereafter, the term moiety derived from a specified molecule refers to the residue of the molecule that by reaction has been included in the polymer, so not including the groups that leave on reaction; for example, a fatty moiety F derived from reacting a fatty acid ester, e.g. coconut oil, with hydroxyl groups on a polymer refers to the fatty acid without proton. Similarly, the weight percentages of the moieties X, Y or F in the polymer refer to the weight of the moiety that is been included in the polymer, so the residue of the molecule that by reaction has been included in the polymer, not including the groups that leave on reaction.

The RMA crosslinkable polymer is what is also referred to as an RMA donor polymer because it has activated C—H acidic groups that react with RMA acceptor groups C═C. The moiety X preferably comprises at least one activated hydrogen atom attached to a carbon atom that is located between two electron-withdrawing groups, which can be carbonyl, cyano, sulfoxide or nitro groups, but preferably are carbonyl or cyano groups; —C(═O)— and/or —C≡N groups. More preferably, moiety X is derived from a component A selected from the group of malonate esters, acetoacetate esters, malonamides, and acetoacetamides, cyanoacetate esters and cyanoacetamides.

It can be advantageous in view of further improving adhesion, that the RMA crosslinkable polymer comprises 2 different types of RMA Donor moieties X, referred to as moiety X1 and X2, wherein moiety X2 comprises a C—H acidic proton in activated methylene or methine having a pKa (defined in aqueous environment) of at least one, preferably at least two units less than the pKa of the C—H groups in moiety X1 wherein preferably at least 50%, more preferably at least 60, 75, or 80% of the C—H acidic protons in the polymer are from moiety X1 (the predominant type of moiety) and wherein preferably moiety X1 is from a malonate and moiety X2 preferably is from an acetoacetate.

In a further preferred embodiment, the RMA crosslinkable polymer of the invention further comprises a fatty moiety F, preferably a fatty moiety F derived from one or more of the group of fatty acids, fatty alcohols, fatty amines, fatty thiols and dimeric fatty acid, preferably fatty acids, preferred fatty moieties having 8-40 carbons, preferably more than 8, 9 or 10 and less than 14, 20, 26 or 30, most preferably the fatty moiety F is derived from fatty acids obtained from coconut oil.

Highly saturated oils/fatty acids (e.g. coconut oil, palm kernel oil, tallow) permit to obtain good properties such as flexibility and good film flow/appearance with a lower level yellowing upon aging of the coating. Plus, post-cure via oxidative cure can be reduced or eliminated with highly saturated oils/fatty acids which may be desirable since in some instances this can lead to cracking and delamination. This is particularly important on more dynamic substrates such as wood. Most preferably moiety F is derived from coconut oil.

With the RMA crosslinkable polymer good adhesion is achieved and good overall properties can be achieved without using fatty components. However, it appeared that the fatty moiety F improves the balance of adhesion and appearance of the cured coating. It is believed that moiety F results in good flow, appearance and surface wetting to a variety of substrates and helps to reduce the surface tension of the polymer while internally plasticizing the polymer giving flexibility and resistance to cracking/shrinkage with aging of the coating film. Preferably the amount of moiety F in the polymer is in the range between 0 and 20 wt. %, more preferably between 1 and 15 wt. %, even more preferably between 3 and 15 wt. % It was found that with increasing fatty moiety F also increased amounts of moiety Y or moiety X2 or both are desirable, preferably derived from isosorbide and/or acetoacetate, to maintain good adhesion, in particular at low CH EQW. Preferred combinations of polymer features are described herein below. A relatively high amount of fatty moiety F, typically above 5 or 8 wt. %, can be offset by including in the RMA crosslinkable composition a separate compound SX comprising moiety X1 or X2, preferably only moiety X2, which compound preferably has a CH-EQW below 150, preferably below 100 and more preferably below 80 for example TMP-tris-acetoacetate or glucose-tris-acetoacetate. This is advantageous in view of mechanical coating properties like hardness. However, in view of color stability the amount of such separate compound SX is preferably low, preferably lower than 10 or 15 wt. % of the malonate containing polymer according to the invention.

The RMA crosslinkable polymer of the invention can in principle be any type of polymer but preferably is a polyester, polyurethane or polycarbonate comprising moieties X and Y, optionally moiety X1 and X2 and preferably also moiety F.

The moiety Y in the RMA crosslinkable polymer is preferably derived from hydrogenated, dehydrated and/or pyrolyzed saccharides, polysaccharides. The advantage, for example compared to RMA crosslinkable polymer comprising saccharides as moiety Y, is that these moiety Y components are less sensitive to heat and discoloration on polymerizing or on curing of the coating. The moiety Y in the RMA crosslinkable polymer can also be a heterocyclic spiro-compound having oxygen atoms in at least one of the rings (i.e. an oxaspiro compound) or a cyclic ketal in which the ketal carbon is the only common atom of two spiro-rings (i.e. a spiroketal compound) Preferably, moiety Y is derived from a dianhydrohexitol, more preferably isosorbide or its isomers isomannide and isoidide, most preferably isosorbide, or wherein moiety Y is derived from an oxaspiro compound, preferably 3,9-bis(1,1-dimethyl-2-hydroxyethyl)-2,4,8,10-tetraoxaspiro[5.5]undecane (also referred to as spiroglycol).

The RMA crosslinkable polymer preferably has an acid value AV between 0 and 3, preferably 0-2 and more preferably between 0 and 1 mg KOH/g polymer. Higher AV can be used and could be beneficial to some extent to adhesion, but if used should preferably be offset by a higher amount of base catalyst, preferably by equal molar amounts. The hydroxy value OHV of the polymer preferably is between 10 and 150, preferably between 20 and 120, more preferably between 30 and 110, even more preferably between 40 and 110 mg KOH/g polymer. A higher value of OHV is beneficial for adhesion, but too high OHV may lead to slower drying and is potentially detrimental for coating properties like water resistance.

The RMA crosslinkable polymer preferably has a number-average molecular weight Mn between 350 and 5000 g/mol, preferably between 500, 750 or 1000 and 3000, 4000 or 5000 g/mol, more preferably between 750 and 3000 and having a weight-average molecular weight Mw between 400 and 25000 g/mol, preferably between 400, 450, 500, 750, 1000 or 1500 and 15000, 20000 or 25000 g/mol, more preferably between 1500 and 6000 g/mol and having a total C—H equivalent weight EQW between 80 and 800 g/Eq, preferably between 100 and 500 g/Eq, more preferably between 150 and 300 g/Eq, even more preferably between 150 and 250 g/Eq.

The RMA crosslinkable polymer is preferably further characterized by a. Having a total C—H equivalent weight between 80 and 800 g/Eq, preferably between 100 and 500 g/Eq, more preferably between 150 and 300 g/Eq, even more preferably between 150 and 250 g/Eq, and in case the polymer comprises a moiety X1 and a moiety X2 as described above, preferably having a CH EQW of moiety X1 between 100 and 500 g/Eq and having a CH EQW of moiety X2 between 500 and 1000 g/Eq, b. Having a moiety Y in an amount of at most 80 wt. %, preferably at most 75 or 60 wt. %, more preferably between 0.01-45 wt. %, preferably between 5 and 35 wt. %, more preferably between 5 and 30 wt. % and even more preferably between 7 and 25 wt. %, c. Optionally having a fatty moiety F in an amount between 0 and 20, preferably between 0 and 15, more preferably between 0 and 10 and optionally between 0 and 5 wt. %, wherein wt. % of a moiety Y or F is defined as the weight of moiety Y or F comprised in the polymer relative to the total weight of the polymer×100%.

The balance of good adhesion and other properties, in particular coating appearance properties, is complicated. When optimizing for adhesion (dry adhesion and wet adhesion as measured by Quick Condensation Testing, QCT), certain combinations of features give particular good adhesion. Herein adhesion is measured and defined, as described below in more detail, in a cross-hatch delamination test. All the ranges below are calculated to reflect the actual amount of the moieties in the polymer, so not including groups lost during synthesis as a distillate. Preferably, RMA crosslinkable polymers comprise the following combinations of features a. moiety X in an amount such that the total C—H equivalent weight of the polymer is between 80 and 800 g/Eq, moiety Y in an amount between 0.01-45 wt. %, optional fatty moiety F in an amount between 0 and 20 wt. %, optional moiety X2 in an amount resulting in a C—H equivalent weight for X2 that is higher than 330 g/Eq (wt. % defined as described above) or b. moiety X in an amount such that the total C—H equivalent weight of the polymer is between 100 and 500 g/Eq, moiety Y in an amount between 0.01 and 40 wt. %, optional fatty moiety F in an amount between 0 and 15 wt. % and optional moiety X2 in an amount resulting in a C—H equivalent weight for X2 that is higher than 500 g/Eq, or more preferably c. moiety X in an amount such that the total C—H equivalent weight of the polymer is between 150 and 300 g/Eq, moiety Y in an amount between 5 and 30 wt. %, optional fatty moiety F in an amount between 0 and 10 wt. % and moiety X2 in an amount resulting in a C—H equivalent weight for X2 between 500 and 1700 g/Eq, or even more preferably d. moiety X in an amount such that the total C—H equivalent weight of the polymer is between 150 and 250 g/Eq, moiety Y in an amount between 5 and 25 wt. %, optional fatty moiety F in an amount between 0 and 5 wt. % and moiety X2 in an amount resulting in a C—H equivalent weight for X2 between 600 and 1000 g/Eq, or e. moiety X in an amount such that the total C—H equivalent weight of the polymer is between 150 and 500 g/Eq, moiety Y in an amount between 7 and 45 wt. %, fatty moiety F in an amount between 1 and 15 wt. % and moiety X2 in an amount resulting in a C—H equivalent weight for X2 between 600 and 1000 g/Eq.

Moiety F is preferred in view of a good balance between good adhesion and good coating appearance. The amount of moiety F is preferably at least 1, more preferably at least 3 wt. %. Good results are also obtained with higher amount of moiety F of at least 5 or 8 wt. %, but when using higher amounts of moiety F, it was found to be advantageous and preferred to also increase the amount of moiety Y and/or moiety X2. Also, it has been found that at low CH EQW more moiety Y is preferred for good adhesion. When low CH EQW and high moiety F are combined, higher moiety Y and X2 are preferred for obtaining better adhesion. Alternatively, preferred combinations of features are in RMA crosslinkable polymers having a. a total CH-EQW between 130 and 190 g/Eq and
  i. the amount of moiety F is less than 8 wt. %,
  ii. the amount of moiety Y is between 7 and 40 wt. % and
  iii. the amount of moiety X2 is such that it results in a C—H equivalent weight for X2 that is higher than 600 g/Eq OR b. a total CH-EQW between 130 and 190 g/Eq and
  i. the amount of moiety F is between 8 and 20 wt. %,
  ii. the amount of moiety Y is between 20 and 40 wt. % and
  iii. the amount of moiety X2 is such that it results in a C—H equivalent weight for X2 that is between 600 and 1300 g/Eq OR c. a total CH-EQW between 190 and 250 g/Eq and
  i. the amount of moiety F is less than 8 wt. %,
  ii. the amount of moiety Y is between 5 and 30 wt. % and
  iii. the amount of moiety X2 is such that it results in a C—H equivalent weight for X2 that is between 600 and 1700 g/Eq OR d. a total CH-EQW between 190 and 250 g/Eq and
  i. the amount of moiety F is between 8 and 20 wt. %,
  ii. the amount of moiety Y is between 13 and 40 wt. % and
  iii. the amount of moiety X2 is such that it results in a C—H equivalent weight for X2 that is between 600 and 1700 g/Eq, wherein wt. % is defined as above.

Process for the Preparation of the RMA Crosslinkable Polymer

The invention also relates to a process for the preparation of the RMA crosslinkable polymer according to the invention as described above comprising reacting polymer components comprising at least components A and P wherein a. component A has a structure Z1(—C(—H)(—R)—)Z2 wherein R is hydrogen, a hydrocarbon, an oligomer or a polymer, and wherein Z1 and Z2 are the same or different electron-withdrawing groups, preferably chosen from keto, ester or cyano or aryl groups wherein at least one of Z1, Z2 or R comprises one or more reactive group RGA, preferably RGA being an ester, carboxylic acid, hydroxyl, amide, isocyanate or epoxy group, that is reactive with component P,
wherein preferably component A is according to formula 1:

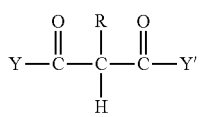

Formula 1 wherein R is hydrogen or an alkyl or aryl and Y and Y' are identical or different substituent groups, preferably alkyl, aralkyl or aryl (R*), or alkoxy (—OR*) or wherein the —C(=O)—Y and/or —C(=O)—Y' is replaced by CN or aryl, preferably by no more than one phenyl,
more preferably component A is selected from the group of malonate esters, acetoacetate esters, malonamides, and acetoacetamides, cyanoacetate esters and cyanoacetamides, and wherein b. component P comprises a moiety Y comprising one or more 5- or 6-membered heterocycles containing an ether-, acetal- or ketal group which in case of two or more of such heterocycles can be fused or linked, which component P comprises one or more reactive groups RGP, preferably selected from hydroxyl, carboxylic acid or -ester groups, that are reactive with component A.

Component P can be a monomer component (YP) comprising a moiety Y or a polymer comprising one or more moieties Y, preferably derived from one or more monomer components YP. To form an RMA crosslinkable polymer according to the invention, a polymer comprising moiety Y (as component P) can be reacted with a component A. Preferably a hydroxy functional polymer comprising moiety Y can be reacted with a component A ester by a transesterification reaction. The moiety Y can be built into the polymer as a (co-)monomer component YP comprising one or more moieties Y, preferably one moiety Y, and one or more reactive groups RGP reactive with one or more of the other polymer components, preferably selected from hydroxyl, carboxylic acid or -ester groups.

In case of an RMA crosslinkable polymer comprising moieties X1 and X2, a component A2 comprising a moiety X2 is added preferably simultaneous with component A1 comprising moiety X1.

Optional component F is preferably added to the reaction mixture and present in the polymerization reaction but can also be reacted with a polymer component P after the polymerisation reaction and before or after reacting the polymer component P with component A. In case of a polyester, it is preferred to add component F during the polyester polymerisation.

Optional Component D is preferably added as a separate unreacted component after the polymerization reaction(s) to form the RMA crosslinkable polymer of the invention but can be added also before or during the polymerisation reaction if it does not or not substantially react with the RMA crosslinkable polymer in the polymerisation reaction.

The RMA crosslinkable polymer of the invention preferably is a polyester, but also can be polyurethane or polycarbonate. The polymer can be prepared by reacting a component P comprising moiety Y, preferably a monomer component YP, as a co-monomer in the polymerization reaction forming a polyester, polyurethane or polycarbonate. Alternatively, the polymer is prepared by modifying a polymer comprising functional reactive groups with a monomer component YP or component A or both, for example by reacting a polymer comprising hydroxy-, acid-, ester-, iso-cyanate- or epoxy functional groups with a component YP. In a preferred embodiment monomer component YP is used as a monomer in the polymerization reaction and the resulting polymer is reacted with components A, for example by transesterification reaction of hydroxy-functional groups on the polymer with components A in ester form (for example diethylmalonate and ethylacetoacetate). Possible transesterification catalysts include n-butyltin trioctoate and/or tetra-n-butyltitanate.

The process for the preparation of polyesters, polyurethane or polycarbonate polymers is generally known in the art and the polymer of the invention can be prepared by known processes simply by replacing a quantity of monomers in the known process with a component YP as a monomer. Preferably, the reactive groups of component P are the same as the reactive groups of the monomer that is replaced, so for example in the known process a diol is replaced with a component P diol, e.g. isosorbide.

Preferably the polymer of the invention is a polyester obtainable by a process wherein a monomer component YP comprising a moiety Y and 2 hydroxyl groups is reacted, optionally together with other hydroxyl functional components, with anhydrides and/or carboxylic acids to form a polyester component P, followed by adding a component A and reacting component A with the obtained polyester component P, preferably by transesterification in the presence of a transesterification catalyst.

WO 2011/058130 describes polyesters that can be prepared from renewable resources and/or recycled materials, including polyester comprising isosorbide and the isomers thereof and to their use and their production process. Although this document does not describe RMA crosslinkable polyester polymers comprising activated C—H acidic donor groups, does not describe RMA crosslinkable compositions and does not describe the problem of adhesion in RMA crosslinkable compositions, the general description of polyesters preparation can also be used for the preparation of RMA crosslinkable polyester polymer of the invention and is incorporated herein by reference.

An RMA crosslinkable polyester polymer of the invention is typically made in a 2-step process, in which first an OH-functional polyester prepolymer is made by esterification. In a second step, this prepolymer is reacted with component(s) A, preferably by transesterification. The polyester prepolymer of step 1 is typically made by reacting a mixture comprising:

(a) a di-acid or its anhydride, for example hexa-hydrophthalic anhydride, terephthalic acid and/or isophthalic acid and/or monomer component YP comprising two or more carboxylic acid or carboxylic ester groups, preferably in an amount between from 15 to 60 wt. %, (b) a polyol, for example trimethylolpropane, neopentyl glycol, ethylene glycol and monomer component YP comprising two or more hydroxy groups, preferably in an amount between from 40 and 80 wt. %, wherein the total amount of monomer component YP, either added with acid- or hydroxy functionality, is preferably between 0.01-45 wt. %

(c) optional components F preferably in an amount between from 0 and 35 wt. %, (d) optionally other reactive components in an amount between 0 and 20 wt. % wherein wt. % is relative to the total amount of monomeric components needed to make the polyester prepolymer in step 1. The relative amounts of acid and hydroxy groups in the reaction mixture are chosen such that the acid groups will be substantially completely reacted away, so an excess of diol is preferred.

The above components are polymerized to form a polyester, preferably in the presence of a catalyst, for example butyl stannoic acid, in a temperature range between 200° C. to 260° C., under nitrogen atmosphere while distilling off water condensate and reacting until an acid value is reached below 5, or 3 and more preferably below 1 mg KOH/g.

In step 2, the polyester prepolymer formed in step 1 is reacted with component(s) A in ester form (for example diethylmalonate and ethylacetoacetate) in a temperature range between 140° C. to 190° C., under nitrogen atmosphere while distilling off ethanol condensate, to yield the final RMA crosslinkable polymer as defined above.

The RMA Crosslinkable Composition

The invention further also relates to an RMA crosslinkable composition comprising a RMA crosslinkable donor compound A and a RMA crosslinkable acceptor compound B, which on curing react by RMA reaction to form a crosslinked network, wherein the composition comprises a moiety Y comprising one or more 5- or 6-membered heterocycles containing an ether-, acetal- or ketal group, which in case of two or more of such heterocycles can be fused or linked. The moiety Y is in one or more of i) the RMA crosslinkable donor compound A, ii) the RMA crosslinkable acceptor compound B or iii) on a separate compound SY comprising moiety Y and reactive groups RGP reactive with RMA crosslinkable compound A or B or with the RMA reaction product of RMA crosslinkable compound A or B, wherein the RMA crosslinkable composition comprises a total amount of moiety Y between 0.01 and 35 wt. %, preferably between 1 and 30 wt. %, more preferably between 2 and 20 wt. %, most preferably between 5 and 15 wt. %, wherein wt. % of moiety Y is defined as the weight of moiety Y comprised in the compounds A, B or SY relative to the total weight of all crosslinkable compounds in the composition×100%. The total weight of all crosslinkable compounds in the composition herein means the total weight of all components in the composition that on curing react into the crosslinked network, i.e. including separate compound SY, separate component SX, reactivity moderators D and reactive diluents.

The moiety Y is preferably substantially exclusively on crosslinkable components A or B or on separate compound SY in the composition such that the moiety Y will be incorporated in the crosslinked network in the coating, which prevents leaching of uncrosslinked component comprising the moiety Y and prevents deteriorating the water sensitivity. It is believed that the incorporation of the hydrophilic moiety Y in the crosslinked network increases the adhesion of the crosslinked coating on a substrate without unacceptable compromising on the water sensitivity. Most preferably, the moiety Y in the composition is predominantly, i.e. for more than 50, 60 or even more than 70 mol %, on the RMA crosslinkable polymer according to the invention as described above. Where needed, the amount of moiety Y in the composition can be increased to some extend by addition of compounds B or S containing moiety Y.

The composition may also comprise a mixture of crosslinkable RMA donor polymers according to the invention or a mixture of a crosslinkable RMA donor polymer according to the invention and a crosslinkable RMA donor polymer that is not according to the invention. In a particular embodiment such mixture comprises a relatively high molecular weight RMA crosslinkable donor polymer and a relatively low molecular weight RMA crosslinkable donor polymer as a reactive diluent. In one embodiment, the first crosslinkable RMA donor polymer, preferably but not necessarily a polymer according to the invention, having a weight-average molecular weight Mw of at least 1000 g/mol, preferably at least 1300 or 1500 g/mol and a second low molecular weight crosslinkable RMA donor polymer, preferably but not necessarily according to the invention, having a Mw of at most 1000 g/mol as a reactive diluent. Such low molecular weight crosslinkable RMA donor polymer according to the invention can have a high wt. % of moiety Y and thus efficiently contribute to the adhesion properties of the coating. Preferably, the low molecular weight polymer according to the invention comprises a high amount of moiety Y, preferably between 25 and 80, more preferably between 50 and 75 wt. % and typically an Mn between 330 and 500 g/mol and a Mw of 500-1000 g/mol.

The coating composition may further comprise as separate compound SY a non-polymeric crosslinkable RMA donor compound that comprises moiety Y for example as reactive diluent; for example, an adduct of a monomer component YP and a component A, preferably isosorbide bis-acetoacetate or isosorbide bis-malonate, preferably in an amount less than 30, preferably less than 28, 25 or even less than 20 wt. % relative to total solids in the coating composition.

A suitable example of such low molecular weight (oligomeric) polymer according to the invention is a polyester comprising a 1:2 molar ratio of diethylmalonate to isosorbide, preferably having an Mn between 330 and 600 g/mol and a Mw of 500-1000 g/mol, Mw/Mn between 1.2 or 1.5 and 2 or 2.5 and having an isosorbide content of 70-80 wt. %. Thus, in an alternative embodiment the composition comprises an RMA crosslinkable polymer that is not according to the invention in combination with a relatively high amount of the low molecular weight RMA crosslinkable polymer according to the invention having a high amount of moiety Y, preferably derived from isosorbide, such that the amount of moiety Y in the RMA crosslinkable composition is in the above described range.

RMA acceptor groups are generally ethylenically unsaturated components in which the carbon-carbon double bond C═C is activated by an electron-withdrawing group, e.g. a carbonyl group in the alpha-position. RMA acceptor compound B comprises at least 2 activated unsaturated groups C═C (RMA acceptor groups). Suitable RMA acceptor groups are molecules based on (meth)acrylic acid, (meth)acrylamide, fumaric acid, or maleic acid, substituted versions thereof, or combinations thereof attached to the multifunctional Michael acceptor molecule through an ester linkage or an amide linkage. The most preferred compound B is an acryloyl functional compound. Preferably compound B is low molecular weight and has a high functionality for crosslinking.

In another embodiment a certain amount of the moiety Y may be introduced to the RMA crosslinkable composition by addition of a crosslinkable RMA acceptor compound PB comprising a moiety Y and two or more RMA acceptor groups. Most preferably isosorbide modified with two or more acryloyl groups. Herein, the amount of compound PB in the RMA crosslinkable composition is such that the amount of moiety Y originating from compound PB in the RMA crosslinkable composition is at most 25 wt. %, preferably at most 20, more preferably at most 15 wt. % and preferably between 0.01 and 25 wt. %, preferably between 1 and 20, more preferably between 5 and 15 wt. %. In case the crosslinking functionality of such component PB is 2, for example isosorbide bis-acrylate, the amount of moiety Y originating from compound PB in the RMA crosslinkable composition is at most 15 wt. %, preferably at most 10 wt. % and more preferably at most 5 wt. % and used in combination with a higher functionality crosslinking RMA acceptor compound to avoid too low crosslink density.

Catalyst C

The RMA crosslinkable composition optionally comprises a catalyst C. In a two component (2K) system, the catalyst is provided as a separate compound in a kit of parts, optionally in admixture with one or more of the compounds of the RMA crosslinkable composition provided that these are not reactive in presence of the catalyst. In a one component (1K) system, the RMA crosslinkable composition may comprise a catalyst which becomes active in use for example on raising the temperature or in contact with air.

The catalyst C is preferably chosen inter alia in view of the envisaged application of the RMA crosslinkable composition. A strong base or latent strong base catalyst is preferred. Catalyst systems are in described for various applications in general in for example EP1640388.

The catalyst C preferably is a carbon dioxide blocked strong base catalyst, preferably a quaternary alkyl ammonium bi- or alkyl-carbonate (as described in EP2556169). As this catalyst generates CO2 it is preferred for use in coating layers with a thickness up to 500, 400, 300, 200 or 150 micrometers.

A homogeneous base catalyst C, which can be used for thicker coating layers, is described in EP0326723 which is a catalyst consisting of the combination of a tertiary amine and an epoxide.

A preferred homogeneous catalyst C is a salt of a basic anion X— from an acidic X—H group containing compound wherein X is N, P, O, S or C, and wherein anion X— is a Michael Addition donor reactive with compound B and anion X— is characterized by a pKa(C) of the corresponding acid X—H of more than two units lower than the pKa(A) of the majority compound A and being lower than 10.5. Details of this catalyst are described in PCT/EP2014/056953, which is hereby incorporated by reference.

Another suitable catalyst is described in WO2018/005077, which is a dormant carbamate initiator, preferably a quaternary ammonium carbamate.

Since the RMA crosslinking reaction is base catalyzed, it is preferred not to use acidic compounds in the composition such that the acid base reaction between catalyst C and A and optionally D is not interfered. Preferably the composition is substantially free of acidic compounds either separate or incorporated in A, B or D.

Reactivity Moderator Component D

The RMA crosslinkable composition optionally further comprises, as a separate additive component and not included in the polymer binder according to the invention, an X—H group containing component D being a Michael addition donor wherein X is C, N, P, O or S and wherein the X—H group of component D is characterized by a pKa (defined in aqueous environment) of at least one unit less than the pKa of the predominant C—H groups in moiety X. This component can be used to tune the crosslinking reactivity of the components, for example for increasing open time of a coating. The term predominant C—H groups means the C—H reactive groups of a component A present in the highest number (mole %).

The X—H group in component D, preferably an N—H group containing component, has a pKa (defined in aqueous environment) of at least one unit, preferably two units, less than that of the C—H groups in predominant component A, preferably the pKa of the X—H group in component D is lower than 13, preferable lower than 12, more preferably lower than 11, most preferably lower than 10; it is preferably higher than 7, more preferably 8, more preferably higher than 8.5. In case a C—H acidic moiety X2 is present in the polymer the pKa of component D is preferably lower than the pKa of the C—H acidic moiety X2, preferably lower than 10.7.

Preferably, the X—H functionality (number of groups per molecule) of component D is low and certainly lower than the C—H functionality of the polymer compound A in the composition, preferably 1-10, 2-6, 2-4 or 2-3 wherein the functionality is average number of active C—H per molecule component D.

The component D preferably comprises a molecule containing the N—H as part of a group —(C=O)—NH—(C=O)—, or of a group —NH—(O=S=O)— or a heterocycle in which the nitrogen of the N—H group is contained in a heterocyclic ring preferably chosen from the group of a substituted or unsubstituted succinimide, glutarimide, hydantoin, triazole, pyrazole, imidazole or uracil, preferably chosen from the group of succinimides, benzotriazoles and triazoles.

The component D is present in an amount between 0.1 and 10 wt. %, preferably 0.2 and 7 wt. %, 0.2 and 5 wt. %, 0.2 and 3 wt. %, more preferably 0.5 and 2 wt. % relative to the total solids amount of the crosslinkable composition The component D is present in such amount that the number of X—H groups in component D is no more than 30 mole %, preferably no more than 20, more preferably no more than 10, most preferably no more than 5 mole % relative to C—H donor groups from component A present in the crosslinkable polymer.

The pKa values referred to, are aqueous pKa values at ambient conditions (21° C.). They can be readily found in literature and if needed, determined in aqueous solution by procedures known to those skilled in the art. A list of pKa values of relevant components is given below.

| | | | |
|---|---|---|---|
| Succinimide | 9.5 | Isatine | 10.3 |
| Ethosuximide | 9.3 | Uracil | 9.9 |
| Phthalimide | 8.3 | 4-nitro-2-methylimidazole | 9.6 |
| 5,5-dimethyl hydantoin | 10.2 | Phenol | 10.0 |
| 1,2,4-triazole | 10.2 | Ethylacetoacetate | 10.7 |
| 1,2,3-triazole | 9.4 | ethyl cyano-acetate | 9.0 |
| benzotriazole | 8.2 | acetylacetone | 9.0 |
| benzene-sulfonamide | 10.1 | 1,3-cyclohexanedione | 5.3 |
| nitromethane | 10.2 | Saccharin | 2.0 |
| nitroethane | 8.6 | barbituric acid | 4.0 |
| 2-nitro-propane | 7.7 | diethylmalonate | 13.0 |

Further reactivity modifying components may be added as are known in the art for example for increasing pot-life, for example an alcohol with 2 to 12 carbon atoms.

The relative amounts of the crosslinkable components in the RMA crosslinkable composition are chosen such that the molar ratio of activated unsaturated reactive acceptor groups C=C in component B to the activated acidic reactive donor groups C—H in compound A is between 0.5 and 2 and preferably between 0.75-1.5 or 0.8-1.2.

In case other RMA donor or RMA acceptor groups are present in the crosslinkable composition, the abovementioned ranges apply to all RMA donor and RMA acceptor groups present in the crosslinkable composition.

In case a reactive solvent is present having 2 C—H reactive groups (for example malonate) then these are also included in the total amount of C—H in the above ratio as they are crosslinkable components and get reacted into the crosslinked binder network. In a such embodiment diethylmalonate or ethylacetoacetate, which have 2 C—H acidic groups can be used as reactive solvent or diluent.

In a coating composition the total amount of monofunctional material is preferably limited, otherwise it may negatively affect coating properties. Preferably the total amount monofunctional components (i.e. moieties having only 1 C—H reactive in RMA reactions or only 1 RMA acceptor group C=C) herein is less than 10, preferably less than 5, 3 or even 2 wt. %. This is less critical eg in adhesives.

The RMA crosslinkable composition as described is highly reactive and crosslinks with a short time. Therefore, the RMA crosslinkable composition is usually delivered in the form of a kit of parts wherein the catalyst is separate from the crosslinkable components. A process of coating a substrate surface comprises mixing, shortly before application, the components (parts of the kit of parts) of the RMA crosslinkable composition and applying a layer of the resulting composition on the substrate surface.

Reference is made to EP2556108 and EP2764035 for detailed description of the compounds A, B catalyst C or D in the RMA crosslinkable composition, their preparation, the amounts used in the RMA crosslinkable composition as well as for measurement methods and definitions and are applicable unless described otherwise herein. Most important features are described below in summary.

Coating Compositions

In a coating composition the RMA crosslinkable components A and B and the optional other RMA reactive components on crosslinking form the polymer binder of the coating. The RMA crosslinkable composition may further comprise coating additives like organic solvents T, sag control agents E, adhesion promotors, and usual other coating additives like leveling agents, UV stabilizers, pigments, fillers, flame retardants, etc.

The RMA composition may comprise one or more organic solvents T required for dissolving certain components or for adjusting the RMA composition to an appropriate handling viscosity (e.g. for spraying application). In view of processability during application solvent may be present, typically in an amount of at least 3 or 5 wt. % relative to the total weight of the composition, but preferably no more than 30, 20 or even 15 wt. %. Organic solvents for use in RMA crosslinkable compositions are common coating solvents that do not contain acid impurities like alkyl acetate (preferably butyl or hexyl acetate), alcohol (preferably C2-C6 alcohol), N alkyl pyrrolidine, glycol ether, Di-propylene Glycol Methyl Ether, Dipropylene Glycol Methyl Ether, Propylene Glycol Methyl Ether Acetate, ketones etc.

The amount of volatile solvent can be between 0 and 60, 50 or 40 wt. % but in view of QESH preferably the composition has a low volatile organic compounds (VOC) content and therefore the amount of volatile organic solvent is preferably less than 30, 25, 20, 15, 10, 5 and most preferably less than 2 or even 1 wt. % relative to the total of the crosslinkable components A and B.

In particular, where a low viscosity and a low VOC is required it is preferred that the RMA crosslinkable composition comprises one or more reactive solvents which react with crosslinkable components A or B. The one or more reactive solvents are preferably selected from the group of monomeric or dimeric components A, monomeric or dimeric components B, compounds A' having only 1 or 2 reactive acidic protons (C—H) in activated methylene or methine groups, compounds B' having only 1 reactive unsaturated groups (C=C), most preferably alkyl acetoacetates, dialkyl malonates, mono- or diacrylates. The total amount of volatile organic solvent plus reactive solvents is preferably between 0 and 40 wt. %, preferably between 0 and 30 wt. % and typically 3 or 5 to 30 wt. %, and the volatile organic solvent is less than 5 wt. % relative to the total weight of the RMA composition.

The Primer for the RMA Crosslinkable Composition

The RMA crosslinkable composition of the invention is preferably used as a top-coating over a conventional sealer or primer layer which is preferably based on one or more polymers including epoxy, phenolic, silane, silicone, acrylics, polyurethane, polyurea, polyaspartic polymers and their hybrids. In a preferred embodiment the RMA crosslinkable composition is applied on an epoxy polymer primer layer comprising an amine crosslinker.

Preferably the primer layer is not fully cured when the RMA crosslinkable composition of the invention is applied onto the primer layer and cured. This further improves the adhesion. However good results were also obtained when fully curing the primer both in dry and in wet adhesion tests. Not fully cured state is for example obtained by only drying at room temperature whereas fully cured state is obtained by baking at elevated temperature to substantial completion of the crosslinking reaction.

A Method for Coating a Substrate

The invention also relates to a method for coating a substrate surface with an RMA crosslinked coating comprising a. providing an RMA crosslinkable composition according to the invention, including a catalyst C and preferably including further coating additives, preferably within less than 10 hrs. or 5 hrs. before application on a substrate surface, b. applying the RMA crosslinkable composition directly on a substrate surface or on a primer coated substrate surface, and c. curing the RMA crosslinkable composition, preferably at a temperature below 80, preferably below 60 or even 50° C.

The invention also relates to a coated substrate and to painted articles prepared by the method of the invention as described above. The method for coating allows for an unprecedented high speed of painting substrates or articles. The coated articles are dry to touch and ready for further handling and processing in a very short time.

The invention further also relates in general to the use of the RMA crosslinkable polymer according to the invention or as obtainable according to the preparation method described or to the use of the RMA crosslinkable compositions of the invention in preparation of crosslinkable coating-, sealant-, adhesive-, elastomer-, ink- or foam compositions or in a crosslinked coating, sealant, adhesive, elastomer, ink or foam. Most preferably the use is the use in the field of coatings.

EXAMPLES

The following is a description of certain embodiments of the invention, given by way of example only.

Preparation of an Isosorbide-Containing Malonate-Acetoacetate Polyester MIPE1

MIPE1 is prepared as follows: into a glass round-bottom reactor provided with a distilling column filled with Raschig rings were brought 534.8 g of neopentyl glycol (NOP), 393.8 g of hexahydrophthalic anhydride (HHPA), 41.2 g of trimethylolpropane (TMP), 103.6 g of isosorbide (IsoS) and 0.44 g of butyl stannoic acid (BSA). The mixture was brought to an under-pressure of 100 mbar while purging with a nitrogen flow for 5 minutes and subsequently brought to atmospheric pressure using nitrogen. This vacuum-nitrogen cycle was repeated three times. Thereafter, the mixture was heated to obtain a stirrable slurry, upon which another three vacuum-nitrogen cycles were carried out. Then, the temperature was ramped up to max. 240° C. and the monomer mixture was polymerised while distilling off the water condensate under nitrogen flow to an acid value (AV) of <1 mgKOH/g. The mixture was subsequently cooled down to 120° C. and 413.8 g of diethylmalonate (DEM) and 127.4 g of ethyl acetoacetate (EtAcac) were added. The reaction mixture was heated to 170° C. and ethanol was removed, first under nitrogen flow at atmospheric pressure and then under reduced pressure. The polymer was subsequently cooled and diluted with butyl acetate to 82.5% solids, to yield a material with an OH value (OHV) of 81 mgKOH/g, GPC Mn 1540 g/mol, a malonate active CH equivalent weight (EQW) of 252 g/Eq and an acetoacetate CH EQW of 664 g/Eq. The overall active CH EQW is 183 g/Eq. All mentioned AV, OHV and EQW values are determined on solid polymer.

The molecular weight and molecular weight distribution were determined according to ASTM D 3593 standard by Gel Permeation Chromatography using polystyrene standards, more particularly using size exclusion chromatography. The size-exclusion apparatus used was an Alliance system consisting of a pump, autosampler and He-degasser (Degasys DG-1210 from Uniflows), equipped with a PLgel 5 μm MIXED-C 600×7.5 mm Column and a Plgel 5 μm guard column (50×7.5 mm—Polymer Laboratories). The Column oven (Separations Analytical Instruments) was set at 30° C. Tetrahydrofuran (THF—Extra Dry, Biosolve 206347)+2% acetic acid (Baker 6052) was used as eluent at a flowrate of 0.8 ml/min. Carbon disulfide (Backer) was used as a marker. A Waters 410 refractive index was used as detector. The injection Volume was 100 μl at a concentration of 1.5 mg/ml. Polystyrene standards (Polymer Laboratories), Easical PS-1, 2010-0501 (M range 580 g/mol-8.500.000 g/mol) and Easical PS-2, 2010-0601 (M range 580 g/mol-400.000 g/mol)) were used for calibration using a third order polynomial. Software used for data-analysis was Empower (Waters). In a plot of the eluded weight fraction versus the molecular weight thus obtained, the Mn is molecular weight at which 50% of the molecules have eluded and the Mw is the molecular weight at which 50% of the total mass has eluded.

The malonate/acetoacetate active C—H equivalent weight was determined by titration of the malonate/acetoacetate containing resin with a 25 wt. % sodium methoxide solution in methanol. An azoviolet indicator solution was used to detect the equivalence point.

All other isosorbide-containing malonate polymers MIPE 1-7 were prepared following the same overall procedure as described for MIPE1 above. If coconut oil (CNO) was used, this raw material was added to the reactor along with NOP, HHPA, TMP, IsoS and BSA. Table 1 summarizes the compositions and main properties of the different polymers prepared.

Preparation of Malonated Polyester MPE1

MPE1 is prepared as follows: Into a reactor provided with a distilling column filled with Raschig rings were brought 629.6 g of neopentyl glycol, 433.3 g of hexa-hydrophthalic anhydride and 0.43 g of butyl stannoic acid. The mixture was polymerised at 240° C. under nitrogen to an acid value of <1 mgKOH/g. The mixture was cooled down to 130° C. and 585.2 g of diethylmalonate was added. The reaction mixture was heated to 170° C. and ethanol was removed under reduced pressure. The polymer was subsequently cooled and diluted with butyl acetate to 85% solids, to yield a material with an OH value of 16 mgKOH/g, GPC Mn 1750 g/mol and a malonate equivalent weight of 350 g/Eq (active CH EQW=175 g/Eq). MPE2 is a fatty acid containing malonated polyester prepared in the same way as MPE1 except that coconut oil was added to the reactor along with NOP, HHPA and BSA and amounts as indicated in Table 1.

TABLE 1a

Malonate Isosorbide polyesters (MIPE) and malonate polyester (MPE) compositions

| Polymer | MIPE1 | MIPE2 | MIPE3 | MIPE4 | MIPE5 | MIPE6 | MIPE7 | MPE1 | MPE2 |
|---|---|---|---|---|---|---|---|---|---|
| NOP | 534.8 | 319.3 | 511.4 | 476.7 | 365.9 | 312.4 | 433.5 | 629.6 | 585.9 |
| HHPA | 393.8 | 325.5 | 239.2 | 454.7 | 392.0 | 204.9 | 312.3 | 433.3 | 352.0 |
| SA | — | — | 61.2 | — | — | — | — | — | — |
| CNO | — | — | — | 31.3 | 37.1 | 244.9 | 158.4 | — | 145.9 |
| TMP | 41.2 | — | 69.9 | 39.1 | 38.2 | 34.1 | 38.0 | — | — |
| IsoS | 103.6 | 448.0 | 189.4 | 140.3 | 276.8 | 267.3 | 179.1 | — | — |
| BSA | 0.44 | 0.44 | 0.43 | 0.41 | 0.40 | 0.36 | 0.40 | 0.43 | 0.43 |
| DEM | 413.8 | 576.15 | 647.0 | 318.6 | 346.2 | 480.2 | 503.6 | 585.2 | 564.7 |
| EtAcac | 127.4 | — | — | 104.2 | 123.0 | 89.0 | — | — | — |
| IsoS content [wt %] ** | 7.9 | 34.0 | 14.4 | 10.7 | 21.0 | 20.3 | 13.6 | 0 | 0 |
| Acac content [wt %] ** | 7.6 | 0 | 0 | 6.3 | 7.4 | 5.4 | 0 | 0 | 0 |
| FA content [wt %] * | 0 | 0 | 0 | 2.1 | 2.5 | 16.4 | 10.6 | 0 | 9.7 |

TABLE 1b

Malonate Isosorbide polyesters (MIPE) and malonate polyester (MPE) properties

| Polymer | MIPE1 | MIPE2 | MIPE3 | MIPE4 | MIPE5 | MIPE6 | MIPE7 | MPE1 | MPE2 |
|---|---|---|---|---|---|---|---|---|---|
| Mal. CH EQW [g/Eq] | 252 | 181 | 161 | 327 | 301 | 217 | 207 | 175 | 184 |
| Acac CH EQW [g/Eq] | 664 | — | — | 812 | 688 | 951 | — | — | — |
| Overall CH EQW [g/Eg] | 183 | 181 | 161 | 233 | 209 | 176 | 207 | 175 | 184 |
| OHV [mgKOH/g] | 81 | 77 | 96 | 73 | 79 | 77 | 66 | 16 | 31 |
| $M_n$ [g/mol] | 1540 | 1240 | 1890 | 1590 | 1390 | 1010 | 1610 | 1750 | 1810 |
| $M_w$ [g/mol] | 2800 | 2290 | 4500 | 3060 | 2590 | 1980 | 3590 | 3130 | 3370 |
| SC [wt. % in BuAc] | 82.5 | 79.4 | 80.2 | 82.2 | 82.5 | 82.7 | 83.5 | 85.0 | 79.6 |

NOP = neopentyl glycol;
HHPA = hexahydrophthalic anhydride;
SA = succinic acid;
CNO = coconut oil;
TMP = trimethylolpropane;
IsoS = isosorbide;
BSA = butyl stannoic acid;
DEM = diethyl malonate;
EtAcac = ethyl acetoacetate
* The FA content is the weight of the fatty acid residue in wt % on solid polymer coming from CNO by transesterification of the glyceride not including the weight of the glycerol of the CNO.
** wt % on solid polymer Composition of Catalyst C Catalyst C is prepared by reacting 43.7 g aqueous tetrabutylammonium hydroxide (55%) and 19.7 g diethyl carbonate in 31.8 g n-propanol and 4.8 g water.

Application Testing of Malonate Polyesters in Real Michael Addition Coating Systems Examples A1-A6 and A9

Isosorbide-containing malonate- and/or acetoacetate-functional polyester polymers MIPE1-MIPE7 were applied as donor polymers in Real Michael Addition (RMA) coating systems. They were cured using the multifunctional oligomeric acrylate-functional acceptor polymer ditrimethylolpropane tetraacrylate (DiTMPTA), catalysed by catalyst C. Both the donor and the acceptor polymers are characterised by a very low acid value (AV<1 mgKOH/g) to limit the partial neutralization of the base catalyst. The detailed RMA paint formulations are provided in Table 2. The TiO2 pigment was introduced through a pre-made pigment dispersion in DiTMPTA.

Examples A7 and A8

In addition to IsoS-containing donor polymers, IsoS-containing acceptor polymers were also used to improved especially wet adhesion on RMA coating formulations (Table 2). Formulations A7 and A8 are based on the MPE1 donor polymer which is cured with a mixture of DiTMPTA (80 wt. %) and 20 wt. % of Isosorbide Acrylate 1 (ISA1, example A7) and Isosorbide Acrylate 2 (ISA2, example A8). ISA1 has an isosorbide content of 42 wt. %, ISA2 has an isosorbide content of 56 wt. %.

Comparative Example C1

Donor polymer MPE1 was cured with DiTMPTA as a Comparative Example C1 (Table 2).

TABLE 2

RMA paint formulations

| | A1 | A2 | A3 | A4 | A5 | A6 | A7 | A8 | A9 | C1 | C2 |
|---|---|---|---|---|---|---|---|---|---|---|---|
| Donor polymers [g] | | | | | | | | | | | |
| MIPE1 | 60.37 | | | | | | | | | | |
| MIPE2 | | 57.64 | | | | | | | | | |
| MIPE3 | | | 60.59 | | | | | | | | |
| MIPE4 | | | | 65.50 | | | | | | | |
| MIPE5 | | | | | 63.63 | | | | | | |
| MIPE6 | | | | | | 59.42 | | | | | |
| MIPE7 | | | | | | | | | 62.41 | | |
| MPE1 | | | | | | | 60.61 | 61.25 | | 59.61 | |
| MPE2 | | | | | | | | | | | 64.32 |
| Acceptor polymers [g] | | | | | | | | | | | |
| DiTMPTA | 30.20 | 28.04 | 33.40 | 25.76 | 27.70 | 30.87 | 27.48 | 27.04 | 27.89 | 31.33 | 30.80 |
| ISA1 | | | | | | | 6.87 | | | | |
| ISA2 | | | | | | | | 6.76 | | | |

TABLE 2-continued

RMA paint formulations

| | A1 | A2 | A3 | A4 | A5 | A6 | A7 | A8 | A9 | C1 | C2 |
|---|---|---|---|---|---|---|---|---|---|---|---|
| Pigmentation [g] | | | | | | | | | | | |
| TiO2 (Kronos 2310) | 74.56 | 68.78 | 81.93 | 74.56 | 74.56 | 74.56 | 78.12 | 78.12 | 74.56 | 78.02 | 82.0 |
| Disperbyk 2150 | 3.73 | 3.44 | 4.10 | 3.73 | 3.73 | 3.73 | 3.91 | 3.91 | 3.73 | 3.91 | 4.10 |
| Additives (predissolved) [g] | | | | | | | | | | | |
| 1,2,4-triazole | 0.55 | 0.51 | 0.57 | 0.55 | 0.55 | 0.55 | 0.59 | 0.59 | 0.55 | 0.57 | 0.57 |
| succinimide | 0.32 | 0.37 | 0.32 | 0.32 | 0.32 | 0.32 | 0.43 | 0.43 | 0.32 | 0.41 | 0.41 |
| Additol XL 123N | 0.48 | 0.44 | 0.49 | 0.48 | 0.48 | 0.48 | 0.52 | 0.52 | 0.48 | 0.49 | 0.49 |
| N-propanol | 7.13 | 6.57 | 7.30 | 7.13 | 7.13 | 7.13 | 7.65 | 7.65 | 7.13 | 7.30 | 7.30 |
| Butyl acetate | 4.0 | 3.7 | 4.1 | 4.0 | 4.0 | 4.0 | 4.29 | 4.29 | 4.0 | 4.1 | 4.1 |
| Catalyst C | 4.31 | 3.98 | 4.42 | 4.31 | 4.31 | 4.31 | 4.63 | 4.63 | 4.31 | 4.42 | 4.42 |
| Total [g] | 185.7 | 173.5 | 197.2 | 186.3 | 186.4 | 185.4 | 195. | 195.2 | 185.4 | 190.2 | 198.5 |
| Total polymer [g] * | 80.9 | 74.7 | 82.9 | 80.5 | 81.1 | 80.9 | 86.9 | 86.9 | 80.9 | 83.0 | 83.0 |
| Overall formulation characteristics | | | | | | | | | | | |
| IsoS content [wt %] ** | 4.9 | 20.8 | 8.4 | 7.2 | 13.6 | 12.3 | 3.1 | 4.5 | 8.8 | 0 | 0 |
| Acac content [wt %] ** | 4.7 | 0 | 0 | 4.2 | 4.8 | 3.3 | 0 | 0 | 0 | 0 | 0 |
| FA content [wt %] ** | 0 | 0 | 0 | 1.4 | 1.7 | 9.9 | 0 | 0 | 6.8 | 0 | 6.0 |
| acceptor/donor | 0.95 | 0.95 | 0.95 | 0.95 | 0.95 | 0.95 | 0.95 | 0.95 | 0.95 | 0.95 | 0.95 |
| pigment/binder | 0.93 | 1.0 | 1.0 | 0.93 | 0.93 | 0.93 | 0.91 | 0.91 | 0.93 | 1.0 | 1.0 |
| succinimide [cat. eq] | 0.8 | 1.0 | 0.8 | 0.8 | 0.8 | 0.8 | 1.0 | 1.0 | 0.8 | 1.0 | 1.0 |
| 1,2,4-triazole [cat. eq] | 2.0 | 2.0 | 2.0 | 2.0 | 2.0 | 2.0 | 2.0 | 2.0 | 2.0 | 2.0 | 2.0 |
| catalyst [meq/g polymer] | 0.05 | 0.05 | 0.05 | 0.05 | 0.05 | 0.05 | 0.05 | 0.05 | 0.05 | 0.05 | 0.05 |

* Total amount of solid resin components that react into the network, consisting of donor polymer, acceptor polymer, reactive diluents (if present) and reactivity moderators such as succinimide and 1,2,4-triazole.
** wt % on total polymer, with total polymer = malonate polymer solids + acrylate polymer solids + succinimide + 1,2,4-triazole
acceptor/donor is the mole ratio of acceptor C=C and total C—H of component A and D in the polymer.
pigment/binder is the weight ratio of pigment to the total polymer
Succinimide [cat. eq] is the mole succinimide per mole of ethocarbonate catalyst
catalyst [meq/g polymer] is the mmole ethocarbonate catalyst per gram of solid polymer wherein polymer includes donor and acceptor not including component D.

The obtained paint formulations were applied to a substrate and were tested as described below.

First, an epoxy-amine primer system (the commercially available system Intercure 200HS from AkzoNobel) was applied by conventional spray application onto an aluminum Q panel type AT 36. This primer layer was cured at either room temperature (RT) for 24 h or at 80° C. for 30 minutes as indicated in Table 3. Subsequently, the pigmented RMA formulation was applied by conventional spray application at a dry film thickness of 50-60 μm. The RMA formulation was cured at room temperature (22° C.) and 60% relative humidity.

Dry adhesion measurements (described below) were performed at least 24 hrs following the application of the RMA paint formulation. Wet adhesion testing was carried out as described below. Pendulum hardness measurements were performed after the intervals mentioned in Table 3.

coating appearance was determined by Wavescan analysis AND BY Gloss measurements as described below. Results are in Table 3.

Cross-Hatch Adhesion Testing (Dry and Wet Adhesion Testing)

Adhesion Test:

The results of adhesion testing stated in the following examples are based on the cross-cut adhesion test following the ISO/DIN 2409, ASTM D3359 protocol. The ranking is briefly summarized as follows:

0: The edges of the cuts are completely smooth; none of the squares of the lattice is detached.
1: Detachment of small flakes of the coating at the intersection of the cuts. A cross-cut area not significantly greater than 5% is affected.
2: The coating has flaked along the edges and/or at the intersection of the cuts. A cross-cut area significantly greater than 5%, but not significantly greater than 15% is affected.
3: The coating has flaked along the edges partly or wholly in large ribbons, and/or it has flaked partly or wholly on different parts of the squares. A cross-cut area significantly greater than 15%, but not significantly greater than 35%, is affected.

4: The coating has flaked along the edges of the cuts in large ribbons and/or same squares have detached partly or wholly. A cross-cut area significantly greater than 35%, but not significantly greater than 65% is affected.

5: Any degree of flaking that cannot even be classified by classification 4.

Detachment of flakes or flaking means delamination as a result of poor adhesion. This cross-cut adhesion test is performed to assess dry adhesion and wet adhesion. Dry adhesion results are obtained when the adhesion is tested at least 24 hrs after paint application and storage of the painted panel under standardized conditions (22° C., 60% relative humidity).

Wet adhesion results are obtained when performing the test after exposure of the coating to Quick Condensation Testing (QCT). In this test set-up, the coated face of the painted panels is exposed to condensing water. The QCT tester accelerates outdoor moisture attack, because it supplies controlled amounts of water to the test surface under controlled conditions. The water in the bottom of the test chamber is heated to generate hot vapor. The vapor mixes with air and fills the chamber, creating 100% relative humidity. The test panels are the actual roof of the test chamber and are cooled down by the air on the outside of the chamber. The resulting temperature difference causes the water vapor, consisting of distilled water which is saturated with dissolved oxygen, to condense on the painted side of the panels.

After exposure for 1 or 2 weeks as indicated in Table 3, the coated panel is removed from the QCT apparatus and dried with a cloth. Directly afterwards, cross cuts are applied, and the adhesion test is performed. The actual adhesion test is performed within minutes from removing the panel from the QCT apparatus.

Drying Behavior: Hardness Development by Persoz Hardness Pendulum Dampening Testing Persoz hardness measurement: Persoz pendulum hardness was measured in a climatized room at 23° C., and 55+/−5% relative humidity. Hardness is measured with a pendulum acc. Persoz as described in ASTM D 4366. For the gradient layer thickness panels, hardness is measured at different spots and corresponding layer thickness is measured. If necessary, the hardness at a certain layer thickness is calculated by linear interpolation of the measurement at two different layer thicknesses. Layer thicknesses were measured with a Fischer Permascope MP40E-S.

Drying Behavior; Tack-Free Time Testing

Tack-free time (TFT) was recorded to assess the drying performance. Tack-free times were measured according to the so-called TNO method with a wad of cotton-wool. Tack free time means the drying (i.e. curing) time needed for the coating to become so dry that after dropping the wad on the surface of the coating and after leaving the wad with a weight load of 1 kg applied on the wad for 10 seconds, no residue of the wool-cotton wad is sticking onto the surface after blowing away the wad.

Appearance: Wavescan Analysis

Wavescan analysis: The panels as described above were analyzed using the Wavescan II of Byk instruments. Data were stored using Autochart software from Byk. Analysis was done in the direction perpendicular to the thickness gradient. In this instrument the light of small laser diode is reflected by the surface of the sample under an angle of 60°, and the reflected light is detected at the gloss angle (60° opposite). During the measurement, the "wave-scan" is moved across the sample surface over a scan length of approx. 10 cm, with a data point being recorded every 0.027 mm. The surface structure of the sample modulates the light of the laser diode. The signal is divided into 5 wavelength ranges in the range of 0.1-30 mm and processed by mathematical filtering. For each of the 5 ranges a characteristic value (Wa 0.1-0.3 mm, Wb 0.3-1.0 mm, We 1.0-3.0 mm, Wd 3.0-10 mm, We 10-30 mm) as well as the typical wave-scan-values longwave (LW, approx. 1-10 mm) and short-wave (SW, approx. 0.3-1 mm) is calculated. Low values mean a smooth surface structure. Additionally, a LED light source is installed in the wave-scan DOI and illuminates the surface under 20 degrees after passing an aperture. The scattered light is detected and a so-called dullness value (du, <0.1 mm) is measured. By using the three values of the short-wave range Wa, Wb and du a DOI value is calculated (see Osterhold e.a., Progress in Organic Coatings, 2009, vol. 65, no 4, pp. 440-443).

Appearance: Gloss

Gloss is measured using a gloss meter wherein the axis of an incident beam of light is at a specific angle from the perpendicular to the sample surface and the axis of the receptor is at the mirror reflection of the axis of the incident beam. The readout indicator gives the percentage of the light that reaches the receptor. The measurement is performed at angles of 20, 60 and 85°. The higher the reported value, the better the gloss.

TABLE 3

Application results

| | Example no. | | | | | | | | | | |
|---|---|---|---|---|---|---|---|---|---|---|---|
| | A1 | A2 | A3 | A4 | A5 | A6 | A7 | A8 | A9 | C1 | C2 |
| Drying behavior and hardness development | | | | | | | | | | | |
| Tack free time [min.] | 75 | 65 | 40 | 78 | 83 | 87 | 40 | 40 | 58 | 38 | n.d. |
| Persoz hardness 1 day (50 μm) [s] | 152 | 140 | n.d. | 124 | 137 | 81 | n.d. | n.d. | 103 | 160 | n.d. |
| Persoz hardness 1 week (50 μm) [s] | 184 | n.d. | 147 | 157 | 172 | 105 | 125 | 104 | 133 | 180 | 147 |
| Coating appearance | | | | | | | | | | | |
| Gloss at 20° [GU] | 88.8 | n.d | n.d | 86.9 | 89.5 | 82 | n.d | n.d | 81.5 | 80.0 | n.d |
| Short wave | 6.0 | n.d | n.d | 3.2 | 18.3 | 0.8 | n.d | n.d | 2.6 | 1.4 | n.d |
| Long wave | 9.9 | n.d | n.d | 10.1 | 27.9 | 4.8 | n.d | n.d | 4.8 | 12.4 | n.d |

TABLE 3-continued

Application results

| | Example no. | | | | | | | | | | |
|---|---|---|---|---|---|---|---|---|---|---|---|
| | A1 | A2 | A3 | A4 | A5 | A6 | A7 | A8 | A9 | C1 | C2 |
| Dry adhesion (ISO score) | | | | | | | | | | | |
| RT epoxy primer | (0) | (0) | (0-1) | (0) | 0) | 0) | (1) | (1) | (0) | (1) | (1-2) |
| Baked epoxy primer (30 min. 80° C.) | (0) | (3) | (1-2) | 0) | (0) | (1) | (5) | (5) | (0-1) | (5) | (2-3) |
| Wet adhesion (Quick Condensation Test) (ISO score), 1 week exposure | | | | | | | | | | | |
| RT epoxy primer | (0) | (1-2) | (1-2) | (0) | (0) | (0-1) | (2) | (2) | (1) | (5) | (3) |
| Baked epoxy primer (30 min. 80° C.) | (0) | (1-2) | (1-2) | (2) | (0-1) | (1) | (5) | (5) | (5) | (5) | (5) |
| Wet adhesion (Quick Condensation Test) (ISO score)], 4 weeks exposure | | | | | | | | | | | |
| RT epoxy primer | (0) | (1-2) | (1-2) | (0) | (0-1) | (0) | (2) | (2) | (0) | (5) | (5) |
| Baked epoxy primer (30 min. 80° C.) | (1-2) | (1-2) | (1-2) | (5) | (0-1) | (1) | (5) | (5) | (5) | (5) | (5) |

Primer: Intercure 200 HS, cured at room temperature (RT) or baked at 80° C. during 30 minutes.

Examples A1-A6 show much improved dry and especially wet adhesion performance compared to comparative example C1. At the same time, other coating properties such as Persoz hardness are kept at a good performance level.

Examples A7 and A8 show improved wet adhesion on RT cured epoxy primer compared to C1. From these experiments, it appears that the paint formulation preferably contain more than 0.15 mol IsoS/kg paint to achieve very good dry and wet adhesion.

The examples show good wet and dry adhesion on both RT and baked epoxy primer, especially when containing at least 4.9 wt. % of isosorbide on the total polymer composition (i.e. donor+acceptor+triazole+succinimide). Examples A7 and A8, containing 4.5% or less, do have good dry adhesion but only moderate wet adhesion and poor wet adhesion to baked primer.

In the presence of coconut oil (CNO), more isosorbide is advantageous to reach good wet adhesion on baked primer. For example, 1.6 wt. % of CNO gives relatively poor wet adhesion on baked primer when 8.8 wt. % of Isos is present (A4). Example A5 shows that, at similar CNO and acac contents, good wet adhesion on baked primer is obtained when having 13.6% Isosorbide present.

Resin MIPE7 contains isosorbide and a relatively high amount of fatty acid but no acetoacetate. The wet adhesion of the coating based on this polymer (example A9; Tables 2 and 3) is much better than comparative example C2 having a comparable fatty acid content. This example shows, in comparison with example A6 based on a polymer having an even higher amount of fatty moieties, that with a high loading of fatty moieties still a good adhesion can be obtained if also incorporating acetoacetate and/or a higher amount of moiety Y.

It was found that moiety Y, in particular isosorbide, improves wet adhesion on both RT and baked epoxy. It has also been found that the higher OHV of the polymers according to the invention contributes to better adhesion and gives better appearance.

Preparation of Spiroglycol-Containing Malonate Polyesters MSPE1, MSPE2, MISPE1 and MISPE2.

Polyesters containing spiroglycol (SPG) as a diol monomer were prepared following the same general procedure as described above for MIPE1. Table 4a shows the compositions of these polyester resins, while Table 4b summarizes their main properties. Based on these MSPE and MISPE binders, paint formulations A10 to A13 were prepared according to Table 5. The obtained paint formulations were applied to a substrate and were tested as described above. The results of the tests are listed in Table 6.

TABLE 4a

Malonate Spiroglycol polyesters (MSPE) and Malonate Isosorbide Spiroglycol polyesters (MISPE) compositions.

| Polymer | MSPE1 | MSPE2 | MISPE1 | MISPE2 |
|---|---|---|---|---|
| NOP | 498.4 | 462.6 | 474.9 | 376.4 |
| HHPA | 238.2 | 230.9 | 237.0 | 193.8 |
| CNO | 133.2 | 129.5 | 133.1 | 122.1 |
| TMP | 37.8 | 36.6 | 37.5 | 34.4 |
| SPG | 171.4 | 226.1 | 131.9 | 238.0 |
| IsoS | — | — | 65.7 | 114.3 |
| BSA | 0.40 | 0.4 | 0.4 | 0.4 |
| DEM | 584.7 | 566.9 | 582.0 | 572.6 |
| SPG content [wt %] ** | 13.1 | 17.0 | 10.0 | 18.2 |
| IsoS content [wt %] ** | 0 | 0 | 4.7 | 8.5 |
| FA content [wt %] * | 9.0 | 8.6 | 8.9 | 6.7 |

TABLE 4b

Malonate Isosorbide polyesters (MIPE) and malonate polyester (MPE) properties

| Polymer | MSPE1 | MSPE2 | MISPE1 | MISPE2 |
|---|---|---|---|---|
| Mal. CH EQW [g/Eq] | 178 | 184 | 179 | 182 |
| OHV [mgKOH/g] | 64 | 58 | 79 | 91 |
| $M_n$ [g/mol] | 1970 | 1870 | 2110 | 1720 |

TABLE 4b-continued

Malonate Isosorbide polyesters (MIPE) and malonate polyester (MPE) properties

| Polymer | MSPE1 | MSPE2 | MISPE1 | MISPE2 |
|---|---|---|---|---|
| $M_w$ [g/mol] | 4590 | 4050 | 4830 | 3540 |
| SC [wt. % in BuAc] | 84 | 84 | 82 | 82 |

NOP = neopentyl glycol;

HHPA = hexahydrophthalic anhydride;

CNO = coconut oil;

TMP = trimethylolpropane;

SPG = spiroglycol;

IsoS = isosorbide;

BSA = butyl stannoic acid;

DEM = diethyl malonate

* The FA content is the weight of the fatty acid residue in wt. % on solid polymer coming from CNO by transesterification of the glyceride not including the weight of the glycerol of the CNO.
** wt. % on solid polymer

TABLE 5

RMA paint formulations

| | Example no. | | | |
|---|---|---|---|---|
| | A10 | A11 | A12 | A13 |
| Donor polymers [g] | | | | |
| MSPE1 | 60.45 | | | |
| MSPE2 | | 61.20 | | |
| MISPE1 | | | 62.06 | |
| MISPE2 | | | | 62.19 |
| Acceptor [g] | | | | |
| DiTMPTA | 31.23 | 30.59 | 31.12 | 31.01 |
| Pigmentation [g] | | | | |
| TiO2 (Kronos 2310) | 78.02 | 78.02 | 78.02 | 78.02 |
| Disperbyk 2150 | 3.91 | 3.91 | 3.91 | 3.91 |
| Additives (predissolved) [g] | | | | |
| 1,2,4-triazole | 0.57 | 0.57 | 0.57 | 0.57 |
| succinimide | 0.24 | 0.24 | 0.24 | 0.24 |
| Additol XL 123N | 0.49 | 0.49 | 0.49 | 0.49 |
| N-propanol | 4.10 | 4.10 | 4.10 | 4.10 |
| Butyl acetate | 7.30 | 7.30 | 7.30 | 7.30 |
| Catalyst C | 4.42 | 4.42 | 4.42 | 4.42 |
| Total [g] | 190.73 | 190.84 | 192.23 | 192.25 |
| Total polymer [g] * | 82.8 | 82.8 | 82.8 | 82.8 |
| Overall formulation characteristics | | | | |
| IsoS content [wt %] ** | 0 | 0 | 2.9 | 5.2 |
| SPG content [wt %] ** | 8.0 | 10.6 | 6.1 | 11.2 |
| FA content [wt %] ** | 5.5 | 5.3 | 5.5 | 4.1 |
| acceptor/donor | 0.95 | 0.95 | 0.95 | 0.95 |
| pigment/binder | 1.0 | 1.0 | 1.0 | 1.0 |
| succinimide [cat. eq] | 0.6 | 0.6 | 0.6 | 0.6 |
| 1,2,4-triazole [cat. eq] | 2.0 | 2.0 | 2.0 | 2.0 |
| catalyst [meq/g polymer] | 0.05 | 0.05 | 0.05 | 0.05 |

* Total amount of solid resin components that react into the network, consisting of donor polymer, acceptor polymer, reactive diluents (if present) and reactivity moderators such as succinimide and 1,2,4-triazole.
** wt % on solid polymer, with total polymer = malonate polymer solids + acrylate polymer solids + succinimide + 1,2,4-triazole
acceptor/donor is the mole ratio of acceptor C=C and total C—H of component A and D in the polymer.
pigment/binder is the weight ratio of pigment to the total polymer
Succinimide [cat. eq] is the mole succinimide per mole of ethocarbonate catalyst
catalyst [meq/g polymer] is the mmole ethocarbonate catalyst per gram of solid polymer wherein polymer includes donor and acceptor not including component D.

TABLE 6

| Application results | | | | |
|---|---|---|---|---|
| | Example no. | | | |
| | A10 | A11 | A12 | A13 |
| Drying behavior and hardness development | | | | |
| Tack free time [min.] | 40 | 60 | 60 | 60 |
| Persoz hardness 1 day (50 μm) [s] | 135 | 131 | 71 | 96 |
| Coating appearance | | | | |
| Gloss at 20° [GU] | 78.1 | 79.6 | n.d | 80.0 |
| Short wave | 27.2 | 39.8 | n.d | 28.1 |
| Long wave | 11 | 5.4 | n.d | 2.8 |
| Dry adhesion (ISO score) | | | | |
| RT epoxy primer | 1 | 1 | 1 | 0 |
| Baked epoxy primer (30 min. 80° C.) | 1 | 2 | 1 | 0 |
| Wet adhesion (Quick Condensation Test) (ISO score), 1 week exposure | | | | |
| RT epoxy primer | 2 | 1 | 0 | 0 |
| Baked epoxy primer (30 min. 80° C.) | 4 | 4 | 4 | 3 |
| Wet adhesion (Quick Condensation Test) (ISO score)], 4 weeks exposure | | | | |
| RT epoxy primer | 4 | 4 | 1 | 1 |
| Baked epoxy primer (30 min. 80° C.) | 5 | 5 | 5 | 5 |

Table 6 lists the application results showing that spiroglycol significantly improves both dry and wet adhesion of RMA crosslinkable compositions, as can be seen by comparing examples A10 and A11 with C1 and C2. Also, combinations of spiroglycol and isosorbide are effective in improving the adhesion performance of RMA crosslinkable compositions.

The invention claimed is:

1. RMA crosslinkable polymer comprising:
   a. At least one RMA Donor moiety X comprising a C—H acidic proton in activated methylene or methine groups,
   b. At least one moiety Y comprising one or more 5- or 6-membered heterocycles containing an ether-, acetal- or ketal group which in the case of two or more of such heterocycles can be fused or linked,
   wherein the polymer has a weight-average molecular weight Mw of at least 400 g/mol and a C—H equivalent weight CH EQW of at least 80 g/mol.

2. The RMA crosslinkable polymer of claim 1, further comprising a fatty moiety F derived from one or more of the group of fatty acids, fatty alcohols, fatty amines, fatty thiols and dimeric fatty acid.

3. The RMA crosslinkable polymer of claim 1, wherein moiety Y is derived from hydrogenated, dehydrated and/or pyrolyzed saccharides or -polysaccharides or derived from oxaspiro- or spiroketal compounds.

4. The RMA crosslinkable polymer of claim 1, having a number-average molecular weight Mn between 350 and 5000 g/mol and having a weight-average molecular weight Mw between 400 and 25000 g/mol and having a total C—H equivalent weight EQW between 80 and 800 g/Eq.

5. The RMA crosslinkable polymer of claim 1, wherein the polymer has an acid value AV between 0 and 3 KOH/g polymer and a hydroxy value OHV between 10 and 150 KOH/g polymer.

6. The RMA crosslinkable polymer of claim 1, characterized by:
   a. having a total C—H equivalent weight between 80 and 800 g/Eq, and in the case the polymer comprises a moiety X1 and a moiety X2 according to claim 4, having a CH EQW of moiety X1 between 100 and 500 g/Eq and having a CH EQW of moiety X2 between 500 and 1000 g/Eq, and b. having a moiety Y in an amount of at most 80 wt. %, and optionally having a fatty moiety F in an amount between 0 and 20 wt. %, wherein wt. % of a moiety Y or F is defined as the weight of moiety Y or F comprised in the polymer relative to the total weight of the polymer x 100%.

7. The RMA crosslinkable polymer of claim 1, comprising
   a. moiety X in an amount such that the total C—H equivalent weight of the polymer is between 80 and 800 g/Eq, moiety Y in an amount between 0.01-45 wt. %, optional fatty moiety F in an amount between 0 and 20 wt. %, optional moiety X2 in an amount resulting in a C—H equivalent weight for X2 that is higher than 330 g/Eq or
   b. moiety X in an amount such that the total C—H equivalent weight of the polymer is between 100 and 500 g/Eq, moiety Y in an amount between 0.01 and 40 wt. %, optional fatty moiety F in an amount between 0 and 15 wt. % and optional moiety X2 in an amount resulting in a C—H equivalent weight for X2 that is higher than 500 g/Eq, or
   c. moiety X in an amount such that the total C—H equivalent weight of the polymer is between 150 and 300 g/Eq, moiety Y in an amount between 5 and 30 wt. %, optional fatty moiety F in an amount between 0 and 10 wt. % and moiety X2 in an amount resulting in a C—H equivalent weight for X2 between 500 and 1700 g/Eq, or
   d. moiety X in an amount such that the total C—H equivalent weight of the polymer is between 150 and 250 g/Eq, moiety Y in an amount between 5 and 25 wt. %, optional fatty moiety F in an amount between 0 and 5 wt. % and moiety X2 in an amount resulting in a C—H equivalent weight for X2 between 600 and 1000 g/Eq, or
   e. moiety X in an amount such that the total C—H equivalent weight of the polymer is between 150 and 500 g/Eq, moiety Y in an amount between 7 and 45 wt. %, fatty moiety F in an amount between 1 and 15 wt. % and moiety X2 in an amount resulting in a C—H equivalent weight for X2 between 600 and 1000 g/Eq, wherein wt. % is defined as in claim 6.

8. The RMA crosslinkable polymer of claim 1, having
   a. a total CH-EQW between 130 and 190 g/Eq and
      i. the amount of moiety F is less than 8 wt. %,
      ii. the amount of moiety Y is between 7 and 40 wt. % and
      iii. the amount of moiety X2 is such that it results in a C—H equivalent weight for X2 that is higher than 600 g/Eq OR
   b. a total CH-EQW between 130 and 190 g/Eq and
      i. the amount of moiety F is between 8 and 20 wt. %,
      ii. the amount of moiety Y is between 20 and 40 wt. % and
      iii. the amount of moiety X2 is such that it results in a C—H equivalent weight for X2 that is between 600 and 1300 g/Eq OR
   c. a total CH-EQW between 190 and 250 g/Eq and
      i. the amount of moiety F is less than 8 wt. %,
      ii. the amount of moiety Y is between 5 and 30 wt. % and
      iii. the amount of moiety X2 is such that it results in a C—H equivalent weight for X2 that is between 600 and 1700 g/Eq OR
   d. a total CH-EQW between 190 and 250 g/Eq and
      i. the amount of moiety F is between 8 and 20 wt. %,
      ii. the amount of moiety Y is between 13 and 40 wt. % and
      iii. the amount of moiety X2 is such that it results in a C—H equivalent weight for X2 that is between 600 and 1700 g/Eq,
      wherein wt. % is defined as in claim 6.

9. The RMA crosslinkable polymer of claim 1, wherein the fatty moiety F is derived from fatty acids obtained from coconut oil.

10. The RMA crosslinkable polymer of claim 1, wherein moiety Y is derived from isosorbide, or 3,9-bis(1,1-dimethyl-2-hydroxyethyl)-2,4,8,10-tetraoxaspiro[5.5]undecane.

11. The RMA crosslinkable polymer of claim 1, having a number-average molecular weight Mn between 350 and 5000 g/mol and having a weight-average molecular weight Mw between 400 and 25000 g/mol and having a total C—H equivalent weight EQW between 80 and 800 g/Eq.

12. The RMA crosslinkable polymer of claim 1, wherein the polymer has an acid value AV between 0 and 3 KOH/g polymer and a hydroxy value OHV between 10 and 150, KOH/g polymer.

13. The RMA crosslinkable polymer of claim 1, wherein the moiety X comprises at least one activated hydrogen atom attached to a carbon atom that is located between two electron-withdrawing groups.

14. The RMA crosslinkable polymer of claim 13, wherein the moiety X comprises at least one activated hydrogen atom attached to a carbon atom that is located between two electron-withdrawing groups wherein moiety X is derived from a component A selected from the group of malonate esters, acetoacetate esters, malonamides, acetoacetamides, cyanoacetate esters and cyanoacetamides.

15. The RMA crosslinkable polymer of claim 1, comprising 2 different types of RMA Donor moieties X, referred to as moiety X1 and X2, wherein moiety X2 comprises a C—H acidic proton in activated methylene or methine having a pKa defined in aqueous environment of at least one unit less than the pKa of the C—H groups in moiety X1.

16. The RMA crosslinkable polymer of claim 15, comprising 2 different types of RMA Donor moieties X, referred to as moiety X1 and X2, wherein moiety X2 comprises a C—H acidic proton in activated methylene or methine having a pKa defined in aqueous environment of at least one unit less than the pKa of the C—H groups in moiety X1 and wherein at least 50% of the C—H acidic protons in the polymer are from moiety X1 and wherein moiety X1 is from a malonate.

17. The RMA crosslinkable polymer of claim 1, being a polyester, polyurethane or polycarbonate comprising moieties X and Y and optionally moiety X1 and X2.

18. The RMA crosslinkable polymer of claim 17, being a polyester, polyurethane or polycarbonate comprising moieties X, optionally comprising moieties X1 and X2, moiety Y and moiety F.

19. A process for the preparation of the RMA crosslinkable polymer according to claim 1, comprising reacting polymer components comprising at least components A and P wherein
   a. component A has a structure Z1(-C(—H)(—R)—)Z2 wherein R is hydrogen, a hydrocarbon, an oligomer or a polymer, and wherein Z1 and Z2 are the same or different electron-withdrawing groups, wherein at least one of Z1, Z2 or R comprises one or more reactive group RGA, that is reactive with component P,

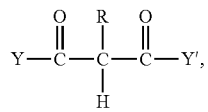

b. a component P comprising a moiety Y comprising one or more 5- or 6-membered heterocycles containing an ether-, acetal- or ketal group which in the case of two or more of such heterocycles can be fused or linked which component P comprises one or more reactive groups RGP that are reactive with component A.

20. The process for the preparation of the RMA crosslinkable polymer according to claim 19, comprising reacting polymer components comprising at least components A and P wherein
   a. component A has a structure Z1(—C(—H)(—R)—)Z2 wherein R is hydrogen, a hydrocarbon, an oligomer or a polymer, and wherein Z1 and Z2 are the same or different electron-withdrawing groups, wherein at least one of Z1, Z2 or R comprises one or more reactive group RGA, that is reactive with component P,
   b. a component P comprising a moiety Y comprising one or more 5- or 6-membered heterocycles containing an ether-, acetal- or ketal group which in the case of two or more of such heterocycles can be fused or linked which component P comprises one or more reactive groups RGP that are reactive with component A,
wherein the RMA crosslinkable polymer is a polyester obtained by a process wherein a monomer component YP comprising a moiety Y and 2 hydroxyl groups is reacted, optionally together with other hydroxyl functional components, with anhydrides and/or carboxylic acids to form a polyester component P, followed by adding the component A and reacting the component A with the obtained polyester component P.

21. An RMA crosslinkable composition comprising a RMA crosslinkable donor compound A and a RMA crosslinkable acceptor compound B, which on curing react by RMA reaction to form a crosslinked network,
   wherein the composition comprises a moiety Y comprising one or more 5- or 6-membered heterocycles containing an ether-, acetal- or ketal group, which in the case of two or more of such heterocycles can be fused or linked,
   the moiety Y being in one or more of i) the RMA crosslinkable donor compound A, ii) in the RMA crosslinkable acceptor compound B or iii) in a separate compound SY comprising moiety Y and reactive groups RGP reactive with RMA crosslinkable compound A or B or with the RMA reaction product of RMA crosslinkable compound A or B,
   wherein the RMA crosslinkable composition comprises a total amount of moiety Y between 0.01 and 35 wt. %, wherein wt. % of moiety Y is defined as the weight of moiety Y comprised in the compounds A, B or S relative to the total weight of all crosslinkable compounds in the composition x 100%,
   wherein the RMA crosslinkable composition comprises, as crosslinkable RMA donor compound A, an RMA crosslinkable polymer according to claim 1, or a mixture of a first RMA crosslinkable polymer according to claim 1 having a weight-average molecular weight Mw of at least 1000 g/mol and a second RMA crosslinkable polymer having a Mw of at most 1000 g/mol as a reactive diluent,
   wherein the RMA crosslinkable composition optionally comprises a catalyst C and
   wherein the RMA crosslinkable composition optionally comprises an X—H group containing component D being a Michael addition donor wherein X is C, N, P, O or S and wherein the X—H group of component D is characterized by a pKa defined in aqueous environment of at least one unit less than the pKa of the predominant C—H groups in moiety X and
   wherein the RMA crosslinkable composition optionally comprises a crosslinkable RMA acceptor compound PB comprising one or more moieties Y and two or more RMA acceptor groups, wherein the amount of compound PB in the RMA crosslinkable composition is such that the amount of moiety Y originating from compound PB in the RMA crosslinkable composition is at most 25 wt. %.

22. A method for coating a substrate surface with an RMA crosslinked coating comprising:
   a. Providing an RMA crosslinkable composition according to claim 13, including catalyst C,
   b. applying the RMA crosslinkable composition directly on a substrate surface or on a primer coated substrate surface, and
   c. curing the RMA crosslinkable composition.

23. A coated substrate prepared by the method of claim 22.

24. Process for the preparation of crosslinkable coating-, sealant-, adhesive-, elastomer-, ink- or foam compositions comprising the step of providing the RMA crosslinkable compositions of claim 13.

* * * * *